United States Patent [19]
Tanaka et al.

[11] Patent Number: 5,344,189
[45] Date of Patent: Sep. 6, 1994

[54] VEHICLE HEIGHT ADJUSTING DEVICE

[75] Inventors: Koji Tanaka; Takashi Shima, both of Kawasaki, Japan

[73] Assignee: Isuzu Motors Limited, Kawasaki, Japan

[21] Appl. No.: 945,650

[22] PCT Filed: Feb. 25, 1992

[86] PCT No.: PCT/JP92/00199
§ 371 Date: Dec. 22, 1992
§ 102(e) Date: Dec. 22, 1992

[87] PCT Pub. No.: WO92/15465
PCT Pub. Date: Sep. 17, 1992

[30] Foreign Application Priority Data
Feb. 27, 1991 [JP] Japan ................. 3-056063

[51] Int. Cl.$^5$ .................................................. B60S 9/00
[52] U.S. Cl. ......................... 280/840; 280/6.12; 280/708
[58] Field of Search ............... 280/6.12, 840, 708, 280/711, 714, DIG. 1

[56] References Cited
U.S. PATENT DOCUMENTS

| | | | |
|---|---|---|---|
| 2,974,946 | 3/1961 | Tuczek | 280/711 |
| 3,008,729 | 11/1961 | Müller et al. | 280/711 |
| 3,836,166 | 9/1974 | Bainbridge et al. | 280/711 |
| 5,098,119 | 3/1992 | Williams et al. | 280/714 |

*Primary Examiner*—Margaret A. Focarino
*Assistant Examiner*—Paul Dickson
*Attorney, Agent, or Firm*—Staas & Halsey

[57] ABSTRACT

A vehicle height adjusting device capable of kneeling without exhausting air in air springs into the atmosphere. It is possible to perform the kneeling in addition to a forward inclination without using supporting legs, a specific pump, and a moving device, as well as a disengaging device therefor. Furthermore, in order to avoid using the aforesaid moving device, kneeling circuits including an air reservoir device are provided, and when kneeling, the air inside the respective air springs is moved to and stored in the air reservoir device. As a result, the front part or the whole of the vehicle body is caused to kneel, while when returning from the kneeling state, the air stored in the air reservoir device is returned to the respective air springs by virtue of hydraulic pressure from a hydraulic source via the kneeling circuits. The entire vehicle body is returned to its original state with a normal air suspension state that is controlled by leveling valves.

12 Claims, 20 Drawing Sheets

VEHICLE HEIGHT ADJUSTING DEVICE

BACKGROUND OF THE INVENTION

1. Field of the Invention

The present invention relates to a vehicle height adjusting device, and more particularly to a vehicle equipped with an air suspension system.

2. Description of the Related Art

A bus, which is used herein to represent a conventional air suspension equipped vehicle, as depicted in FIG. 16, has a bus body 1 supported by a frame 1a around a front suspension, a front axle 2a, and air springs 3a which are interposed between the front frame 1a and the front axle 2a; and a frame 1b around a rear suspension, a rear axle 2b which includes an axle case and an air-spring support beam that is fixed to the axle case, and air springs 3b which are interposed between the rear frame 2b and the rear axle 2b.

Such an air suspension equipped vehicle generally has an air suspension circuit such as shown in FIG. 17. In the illustration, reference numeral 4 denotes an air compressor that is mounted, for example, on an engine (not shown); reference numeral 5 denotes a main tank that stores compressed air supplied by the compressor 4 via an air pipe 6a, which has an air filter 15, a pressure regulating valve 14 and a check valve 16 arranged therein; reference numerals 6, 6c and 6d denote air pipes that carry the compressed air from the main tank 5 to air equipments (not shown) and form the suspension air circuit; and reference numerals 7a and 7b denote well-known leveling valves which are fixed to the bus body and whose respective components include levers 7a1 and 7b1, the ends of which are rotatably supported by the body 1 while the other ends of which are linked to the axles 2a and 2b, respectively. When the pivotal movement of the levers 7a1 and 7b1 detects that the relative positions of the axles 2a and 2b are nearer than their reference positions (i.e., the vehicle body sinks), the leveling valves 7a and 7b permit air to flow from the main tank 5 through the air pipes 6, 6c and 6d to the air springs 3a and 3b. Conversely, when the relative positions of the axles 2a and 2b are farther than their reference positions (i.e., the vehicle body floats), the leveling valves 7a and 7b cut off the air flow from the main tank 5, and exhaust the air within the air springs 3a and 3b to lower the body 1. It should be noted that the leveling valves 7a and 7b operate independently for the front and rear parts of the body, and that they are closed to inhibit the flow of air through the air pipes 6, 6c and 6d so that the air springs 3a and 3b may perform as simple springs for small vibrations encountered under normal running conditions.

This bus suspension system, as shown in FIG. 16, is controlled to maintain a constant vehicle height by using the leveling valves 7a and 7b and therefore an approach angle α, a departure angle β, and a road clearance m are ensured to prevent the vehicle body from touching a road surface while running. On the other hand, the lower the step heights 1 and 1' in FIG. 16 the more convenient for passengers when getting on and off, and time required therefor will be reduced. The reduction of the step heights 1 and 1', however, conflicts with ensuring sufficient values of α, β, and m.

To resolve this problem of conflicting requirements, a function called kneeling has been studied, and many kneeling systems have been proposed. As one example of these systems, Japanese Unexamined Utility Model Publication No. Sho 48-5423, as shown in FIG. 18, has additional solenoid (or manual) three-way switching valves 8a and 8b which are disposed between the leveling valves 7a and 7b and the air springs 3a and 3b, respectively.

This arrangement, under normal conditions, makes the solenoid valve 8a and 8b inactive, thereby communicating the air springs 3a and 3b with the respective leveling valves 7a and 7b to maintain a constant vehicle height. When the vehicle height is lowered, the solenoid valves 8a and 8b are made active (or are manually switched over), and their valve positions are switched over to cut off the air flow between the air springs 3a and 3b and the leveling valves 7a and 7b, while the heights H of the air springs 3a and 3b are decreased by exhausting the air within the air springs 3a and 3b to the atmosphere.

To increase the vehicle height, i.e., to return the vehicle to its original height, the solenoid valves 8a and 8b are made inactive. The air from the main tank 5 is then fed through the leveling valves 7a and 7b to the air springs 3a and 3b until the arms of the leveling valves 7a and 7b become almost horizontal, resulting in the reference height H.

As described above, a kneeling mechanism is designed to facilitate passengers to get on/off and to reduce the time required therefor. The kneeling mechanism, however, requires a great amount of time to return a vehicle to its original height after air has been exhausted. This is because such a vehicle height return is realized by supplying air equal to that exhausted from the solenoid valves 8a and 8b through the main tank 5 from the compressor (not shown), however, with the discharge capacity of a vehicular-mounted compressor, it generally takes several minutes to attain the original vehicle height. Further, since the pressure in the main tank 5 is reduced when the vehicle has returned to its original height, there remains insufficient pressure to drive various equipments.

To compensate for these shortcomings, as illustrated in FIG. 18, one or more auxiliary tanks 9 are provided in which by feeding the air retained in an auxiliary tank 9 to the air springs 3a and 3b the time required to return the vehicle to the original height is reduced.

Although the more a kneeling mechanism with only one auxiliary tank 9 can reduce the time required for attaining the original vehicle height the more the number is increased, an air compressor must be operated continuously for a long time in order to refill the auxiliary tanks that has already released air into the air springs, and the heat built up within the compressor can cause the deterioration of the durability of the air compressor per se.

These shortcomings take advantage of the fact that in pneumatic equipment air as hydraulic fluid can be easily obtained anywhere; and used air can be easily disposed of anywhere. However, whether or not a large volume of air can be provided for a short time depends entirely on an air compressor. To reduce the dependency on an air compressor, there has been proposed a system that does not rely on the above described advantage, i.e., a system that minimizes air exhaustion, or does not exhaust.

As prior art, in the apparatus disclosed in the Japanese Unexamined Patent Publication No. Sho 54-47229, as illustrated in FIG. 19, a supporting leg 30 which raises a bus body 1 behind the center of gravity of the body is provided. A front (Ft) air spring 31 communicates with a rear (Rr) air spring 32 via an air pipe 34 that can carry air from the Ft air spring 31 to the Rr air spring 32.

When, however, the supporting leg 30 is located between the center of gravity and the rear wheels as illustrated, the load supported by the front and rear wheels is reduced by the load supported by the supporting leg 30, so that the front part of the vehicle floats and the vehicle height increases.

Further, even if the supporting leg 30 is located behind the rear wheels to increase the load supported by the front wheels, unless the internal pressure of the Ft air spring 31 exceeds that of the Rr air spring 32, the air flows inversely from the Rr air spring 32, so that the front part of the vehicle floats, and the vehicle height increases.

The supporting leg 30, therefore, must have enough stroke that the internal volume of the Rr air spring 32 can be increased (i.e., expand the air spring) so that the internal pressure of the Rr air spring 32 may always be lower than that of the Ft air spring 31. More specifically, to expand the air spring, it is advantageous to locate the supporting leg closely behind the center of gravity, while to increase the load supported by the Ft air spring 31, it is advantageous to locate the supporting leg behind the rear wheels. In addition to this problem, since passengers' distribution in the vehicle affects the shift of load share, the degree and the time of kneeling may not be constant.

Moreover, in the apparatus disclosed in the above described Japanese Unexamined Patent Publication No. Sho 54-47229, a method is proposed for taking air out of the Ft air spring 31 and feeding it to the Rr air spring 32 by providing a pump 33 that is different from an engine mounted compressor, in an air pipe 34 which directly communicates the Ft air spring 31 with the Rr air spring 32 as illustrated. According to the explanation, this method can overcome a pressure loss resistance (proportional to the air flow rate squared) while the bus is quickly inclined using the supporting leg 30, and depending on the capability of the pump 33, the vehicle can be easily forward inclined without using the supporting leg 30 which is difficult to be adjusted.

However, such prior art where the pump 33 is located in the air pipe 34 directly interconnecting the Ft and Rr air springs 31 and 32, can perform only forward inclinatory kneeling but cannot do kneeling for a middle door section 1d and a rear door section 1e shown in FIG. 16.

Further, when the vehicle is returned to the horizontal condition, the air put back from the Rr air spring 32 must pass through the pump 33 to the Ft air spring 31. Though this could serve as an air flow control, the suspended weights and the weight share are not uniform, and this may cause a problem in the control and adjustment. Another shortcoming is that a device which can disengage the pump from its driving source even in the case of idling.

An air spring device (moving device) disclosed in Japanese Unexamined Utility Model Publication No. Sho 56-141806 as an example of a device that suppresses or prevents air exhaustion has, as illustrated in FIG. 20, an air reservoir device which comprises an air tank 41, a movable partition member 42 that defines two internal spaces of the air tank 41, and a moving device for the partition member 42 that includes a control motor 46, a worm 45, a worm wheel 44, and a ball screw 43 fixed to the partition member 32. An air chamber 41a that is formed of the air tank 41 and the partition member 42 is connected to a Ft air spring 3a (or a Rr air spring 3b) by an air pipe 6c (or 6d), where the internal volumes of the air chamber 41a, the Ft air spring 3a (or the Rr air spring 3b), and the air pipe 6c (or 6d) are arranged to be always constant.

As the control motor 46 of this device is rotated, the worm 45 fixed to the shaft (not shown) of the control motor 46 is rotated. Then, the worm wheel 44 which is engaged with the worm 45 is also rotated, and as a consequence of the rotation, the ball screw 43 whose threads connect with the internal threads in the center hole of the worm wheel 44, moves the partition member 42 to the left or right in the diagram. This movement of the partition member 42 increases or decreases the capacity of the air chamber 41a.

More specifically, if this prior art is applied to a kneeling mechanism, the moving device will pull the partition member 42 to the right in the diagram thereby to increase the capacity of the air chamber 41a, whereby the air from the Ft air spring 3a (or the Rr air spring 3b), which is connected to the air chamber 41a, will be carried to and retained in the air chamber 41a without exhausting the air into the atmosphere, and the air spring height H will be reduced. This is because, as described above, the internal volumes of the air chamber 41a, the Ft air spring 3a (or the Rr air spring 3b), and the air pipe 6c (or 6d) are arranged to be always constant. For the same reason, in the return to the original vehicle height, the moving device drives the partition member 42 inversely, i.e., to the left in the diagram, thereby decreasing the capacity of the air chamber 41a, whereby the air retained in the air chamber 41a can be restored in the air spring and the air spring can be returned to its original height H.

However, the control motor 46 that is used in the moving device disclosed in the above described Japanese Unexamined Utility Model Publication No. Sho 56-141806 must support the suspended weight of a heavy commercial bus and control the up-and-down movement of the vehicle. Therefore, it is disadvantageous that the control motor 46 must be a large motor having a great output and requires a generator and a battery that can continuously supply sufficient power to drive such a large motor. Furthermore, the control motor employed must have positioning accuracy and controllability, and quick responsiveness, and must be able to withstand high loads in the presence of an impact input.

SUMMARY OF THE INVENTION

It is accordingly an object of the present invention to provide a vehicle height adjusting device that can perform kneeling without exhausting the air in an air spring to the atmosphere, and that, in addition to forward inclinatory kneeling, can perform total kneeling without using supporting legs, a specific pump, a driving device, and a disengaging device, as well as the above described moving device.

To achieve the above object, a vehicle height adjusting device according to the present invention comprises: an automatic vehicle height adjusting circuit for connecting a pneumatic source to air springs through leveling valves; air switch-over valve means provided between the leveling valves and the air springs; a kneeling circuit to be connected to the air springs through the air switch-over valve means; a hydraulic source;

and control means for storing the air in the air springs in the kneeling circuit by switching over the air switch-over valve means when kneeling, and for returning the air to the air springs under hydraulic pressure from the hydraulic source in the return of the vehicle height.

When kneeling, the control means in the present invention controls the air switch-over valve means to disconnect the air springs from the leveling valves, and carries the air from the air springs to the kneeling circuit by free dropping operation due to the suspended weight of the vehicle.

As a result, if these air springs support front wheels, the front vehicle height is reduced, so that the vehicle is inclined forward (kneeling).

When the vehicle is returned from the kneeling state, by controlling the air switch-over valve means, the air stored in the kneeling circuit is carried back from the kneeling circuit to the air springs by the hydraulic pressure of the hydraulic source, so that the vehicle original height is obtained. Then, the air switch-over control means is controlled to again connect the air springs to the leveling valves, returning to a normal air suspension state based on the leveling valves.

To perform total kneeling for the front and rear wheels, in addition to controlling the front air springs, the control means can perform kneeling with the rear air springs, which have the same configuration as the front air springs and which are connected in parallel, in the same manner as for the front air springs. When the total kneeling is restored, the control means returns the air stored in the kneeling circuit to the rear air springs in the same manner as for the front air springs to return the rear and front parts to their original heights, and then restores a normal air suspension state based on the leveling valves.

Thus, the air in the air springs is only moved between the air springs and the kneeling circuit, and is not exhausted to the atmosphere.

Further, according to the present invention, the air switch-over valve means may be formed of a branch pipe for the air springs and the kneeling circuit and a shut-off valve provided between the branch pipe and the leveling valves, and the control means may close the shut-off valve only in the return of the vehicle height.

Furthermore, according to the present invention, the kneeling circuit may be formed of an air reservoir device which has a volume variable air chamber and a hydraulic mechanism that uses hydraulic pressure to vary the volume of the air chamber, a shut-off valve, an air pipe which connects the air chamber to the air switch-over valve means via the shut-off valve, a hydraulic switch-over valve, and a hydraulic pipe that connects the hydraulic mechanism to the hydraulic switch-over valve and the hydraulic source.

Moreover, according to the present invention, the air reservoir device may comprise a hydraulic/pneumatic converter with one piston in the container where one space defined by the piston forms an air chamber and the other defined space forms a hydraulic chamber, a hydraulic/pneumatic converter where an air cylinder and an oil cylinder are provided as a pair along a single axis and the piston rod of the air cylinder forms the piston of the oil cylinder, or a hydraulic/pneumatic converter where an air cylinder and an oil cylinder are provided as a pair along a single axis and the piston rods of both of the cylinders are interconnected.

Also, according to the present invention, the control means, when kneeling, may switch over the air switch-over valve means to allow the air springs to communicate with the air chamber, and concurrently switch over the hydraulic switch-over valve to return hydraulic fluid from the hydraulic chamber to a hydraulic tank, thereby introducing and storing the air of the air springs into the air chamber due to the free dropping operation of the suspended weight of the vehicle; while, in the return of the vehicle height, the control means may switch over the hydraulic switch-over valve to permit the hydraulic chamber to communicate with the hydraulic source so that the pressure exerted by the hydraulic fluid from the hydraulic source expands the volume of the hydraulic chamber, thereby decreasing the volume of the air chamber to return the air stored in the air chamber to the air springs.

The hydraulic source can be common with other vehicle mounted hydraulic sources.

DETAILED DESCRIPTION OF THE PREFERRED EMBODIMENTS

The present invention will now be described in detail while referring to the accompanying drawings.

Figure 1:
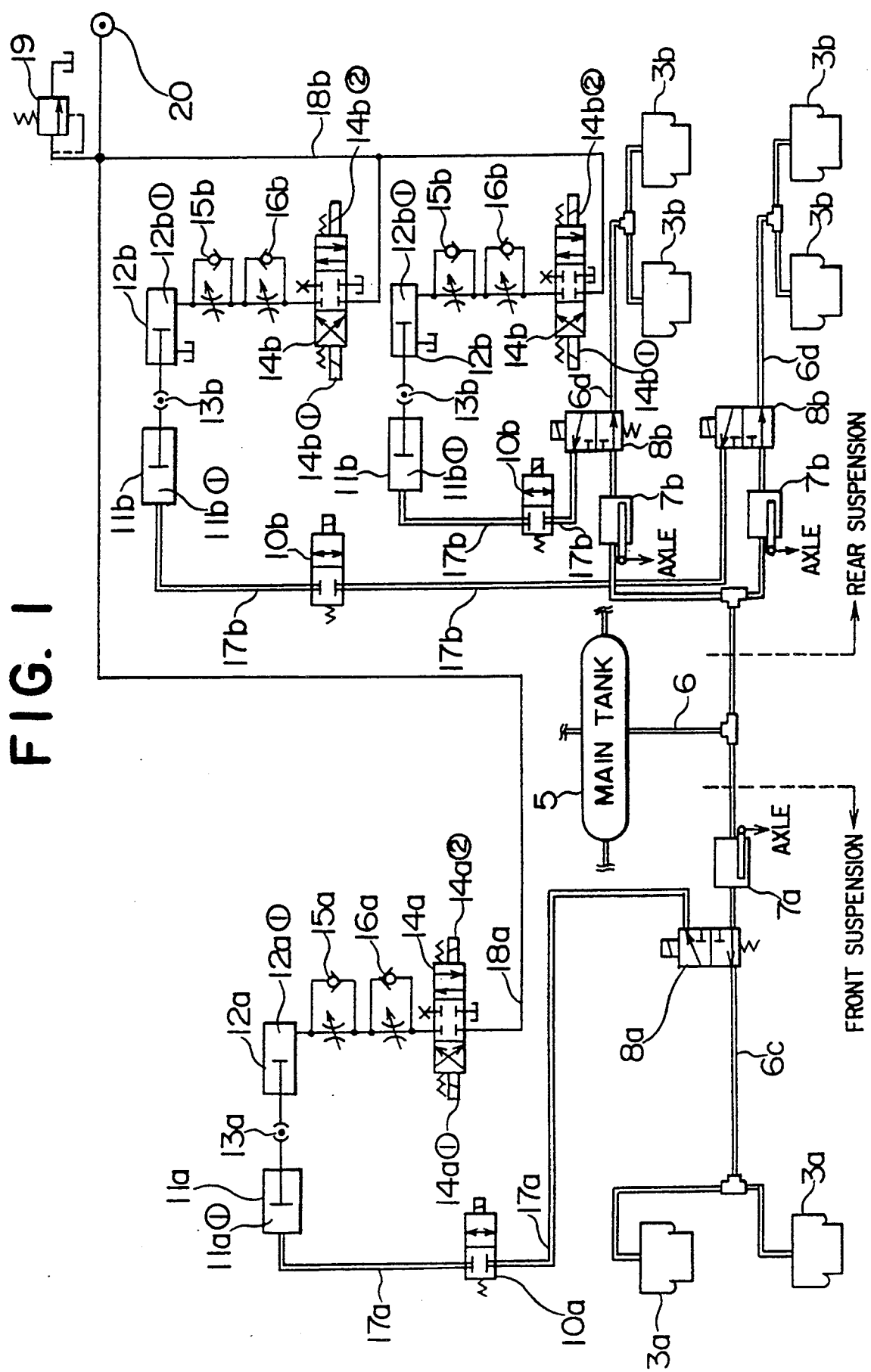
FIG. 1 is a piping diagram illustrating the arrangement of one embodiment of a vehicle height adjusting device according to the present invention.

FIG. 1 is an air piping diagram illustrating the structure of one embodiment of a vehicle height adjusting device according to the present invention. In this embodiment, kneeling circuits branched by three-way solenoid valves 8a and 8b are additionally provided between air springs 3a and leveling valve 7a and between air springs 3b and leveling valve 7b, respectively, which are included in an air suspension circuit for the conventional automatic vehicle height adjusting circuit shown in FIG. 18. It is to be noted that since suspended weights of a heavy commercial bus equipped with a rear engine are generally at a ratio of 1:2 for Ft:Rr, the number of air springs 3 (general reference numeral for 3a and 3b) is also determined at a ratio of 1:2. In the embodiment shown in FIG. 1, therefore, one kneeling circuit unit is employed for the front suspension Ft, and two such units are employed for the rear suspension Rr. Depending on the selection of the application conditions and hydraulic and pneumatic devices, however, a single Ft unit may be used, Ft and Rr units may be combined as a single unit, or plural units which are conversely increased in number may be provided.

Figure 18:
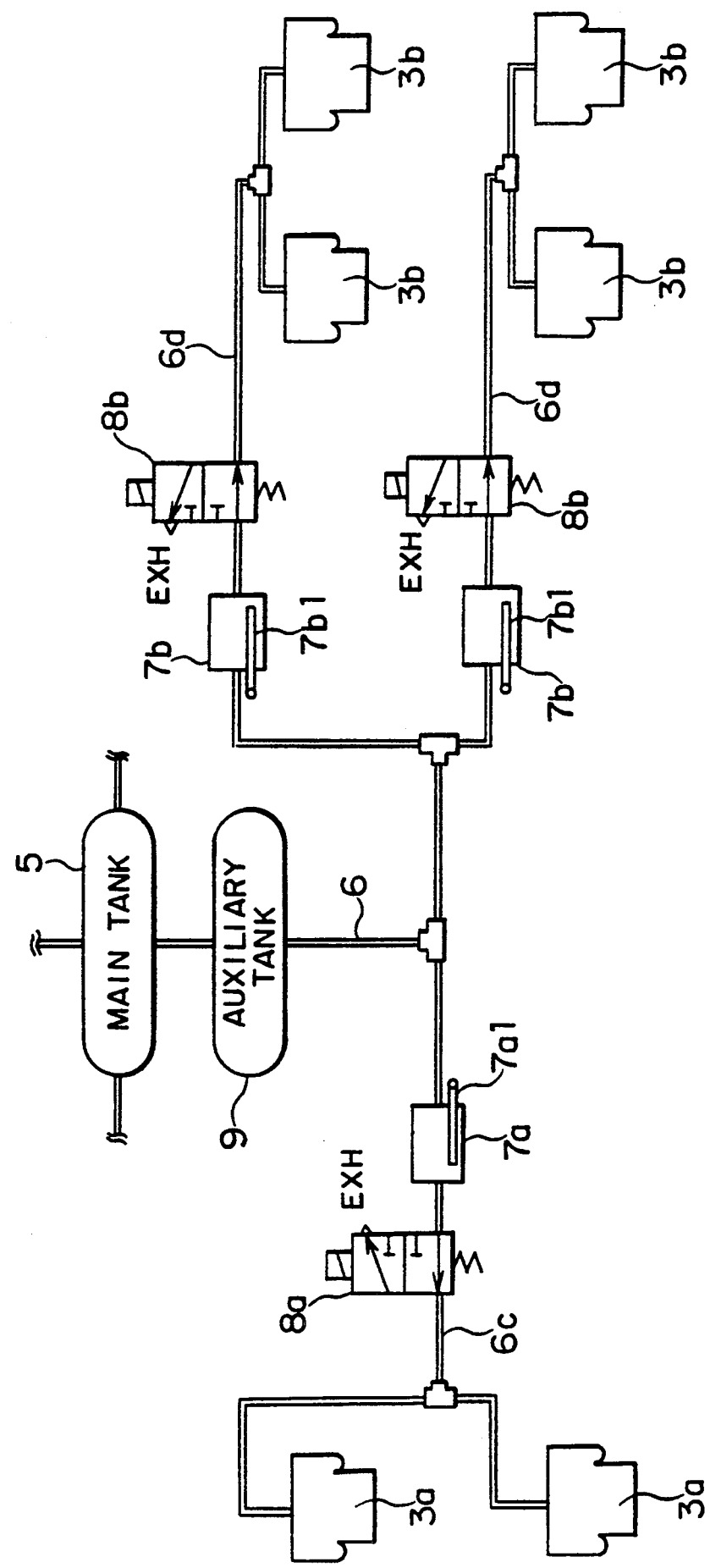
FIG. 18 is a piping diagram showing an air control circuit in another conventional vehicle height adjusting device.
Figure 19:
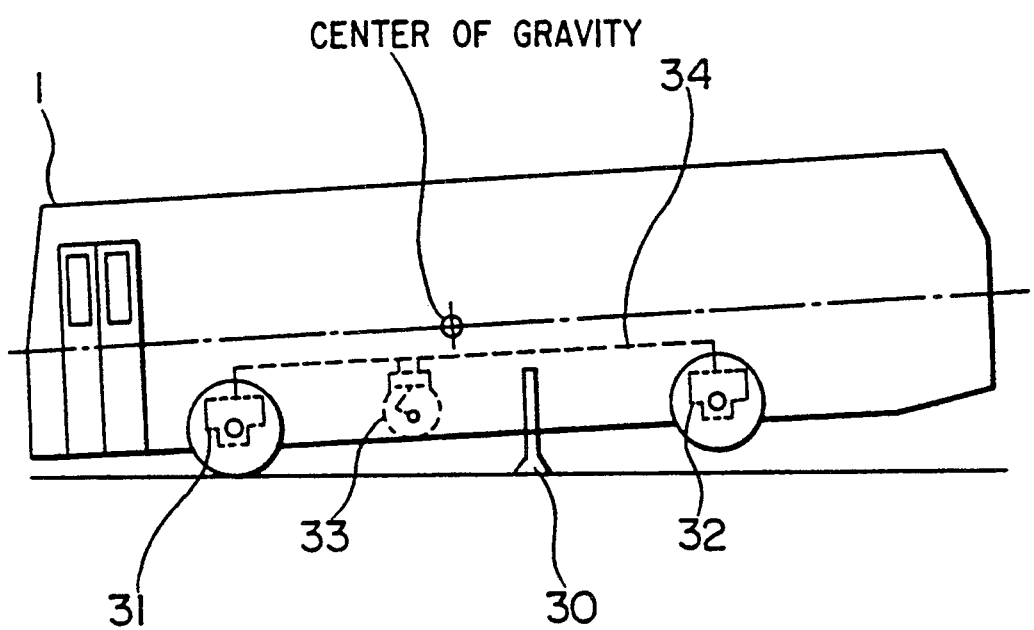
FIG. 19 is a diagram illustrating further prior art (Japanese Unexamined Patent Publication No. Sho 54-47229)
Figure 20:
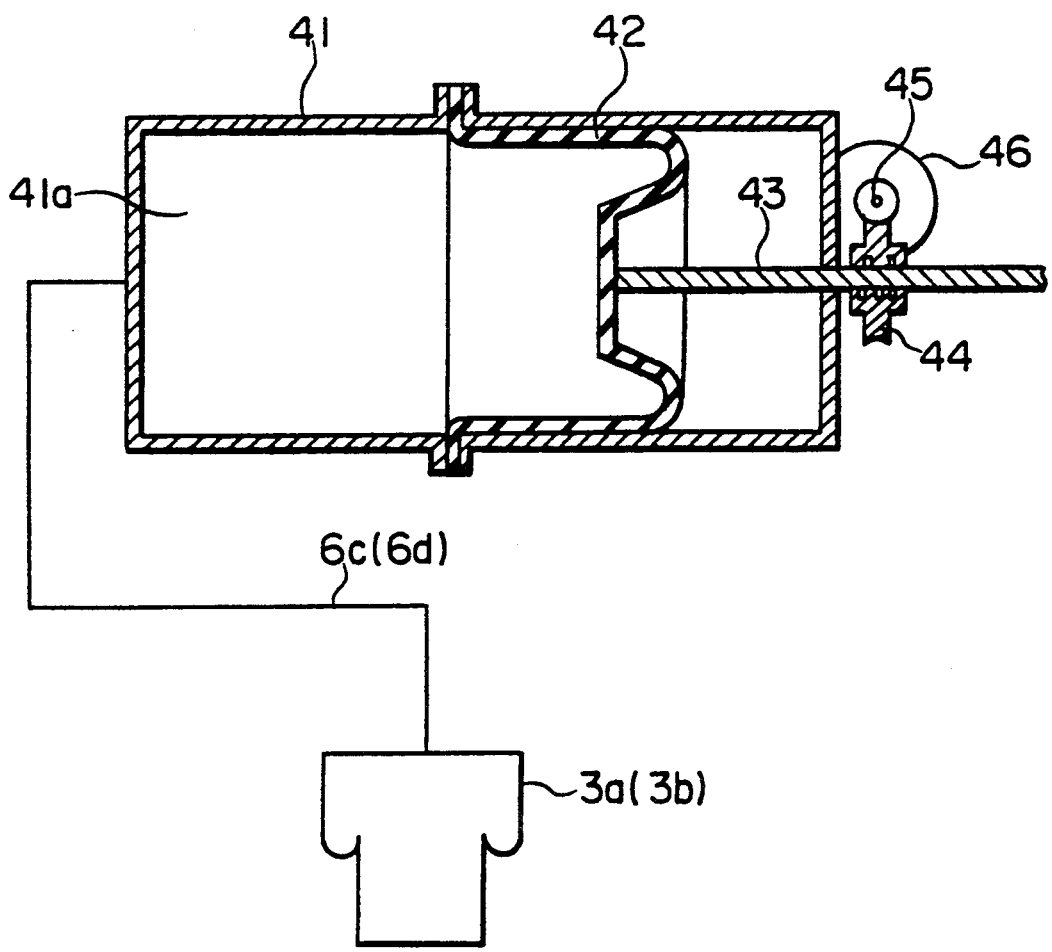
FIG. 20 is a schematic cross sectional view of a prior art moving device.

As the same reference numerals used in FIG. 18 denote identical components in FIG. 1, the descriptions for those components are omitted here. Reference numerals 10a and 10b denote two-way solenoid valves disposed in air pipes 17a and 17b respectively connecting three-way solenoid valves 8a and 8b which serve as air switch-over valves to air cylinders 11a and 11b. Reference numerals 12a and 12b denote oil cylinders which are connected along the same axis to the air cylinders 11a and 11b by couplings 13a and 13b respectively. Reference numerals 14a and 14b are double-action three-way solenoid valves which serve as hydraulic switch-over valves and are disposed along hydraulic pipes 18a and 18b connecting the oil cylinders 12a and 12b to a hydraulic source 20 which will be described hereinafter. These double-action three-way valves 14a and 14b each incorporate therein a kneeling side solenoid ① and a return side solenoid ②, and have three valve positions.

It is to be noted that the above-described three-way solenoid valves 8a and 8b form switch-over valve means; and the air cylinders 11a and 11b, the couplings 13a and 13b and the oil cylinders 12a and 12b form an air reservoir device. This air reservoir device, the two-way solenoid valves 10a and 10b, the double-action three-way solenoid valves 14a and 14b, speed controllers 15a, 15b, 16a, and 16b which will be described hereinafter, the air pipes 17a and 17b, and the hydraulic pipes 18a and 18b form a kneeling circuit. The air reservoir device used in this embodiment is the one depicted in FIG. 15.

The reference numerals 15a, 15b, 16a, and 16b denote speed controllers, which are disposed between the oil cylinders 12a and 12b and the double-action three-way solenoid valves 14a and 14b, and adjust the oil flow rate upon kneeling and returning, and thus control the vehicle height adjusting speed. Reference numeral 19 denotes a relief valve that adjusts the pressure of a hydraulic system so that it may not exceed a set pressure limit.

Finally, the reference numeral 20 designates a hydraulic source, which may be provided only for the kneeling circuit, but the entire quantity of the discharge oil of a power steering pump or a hydraulic pump for a hydraulic-driven radiator fan, etc. may be substituted for the above kneeling circuit.

Figure 2:
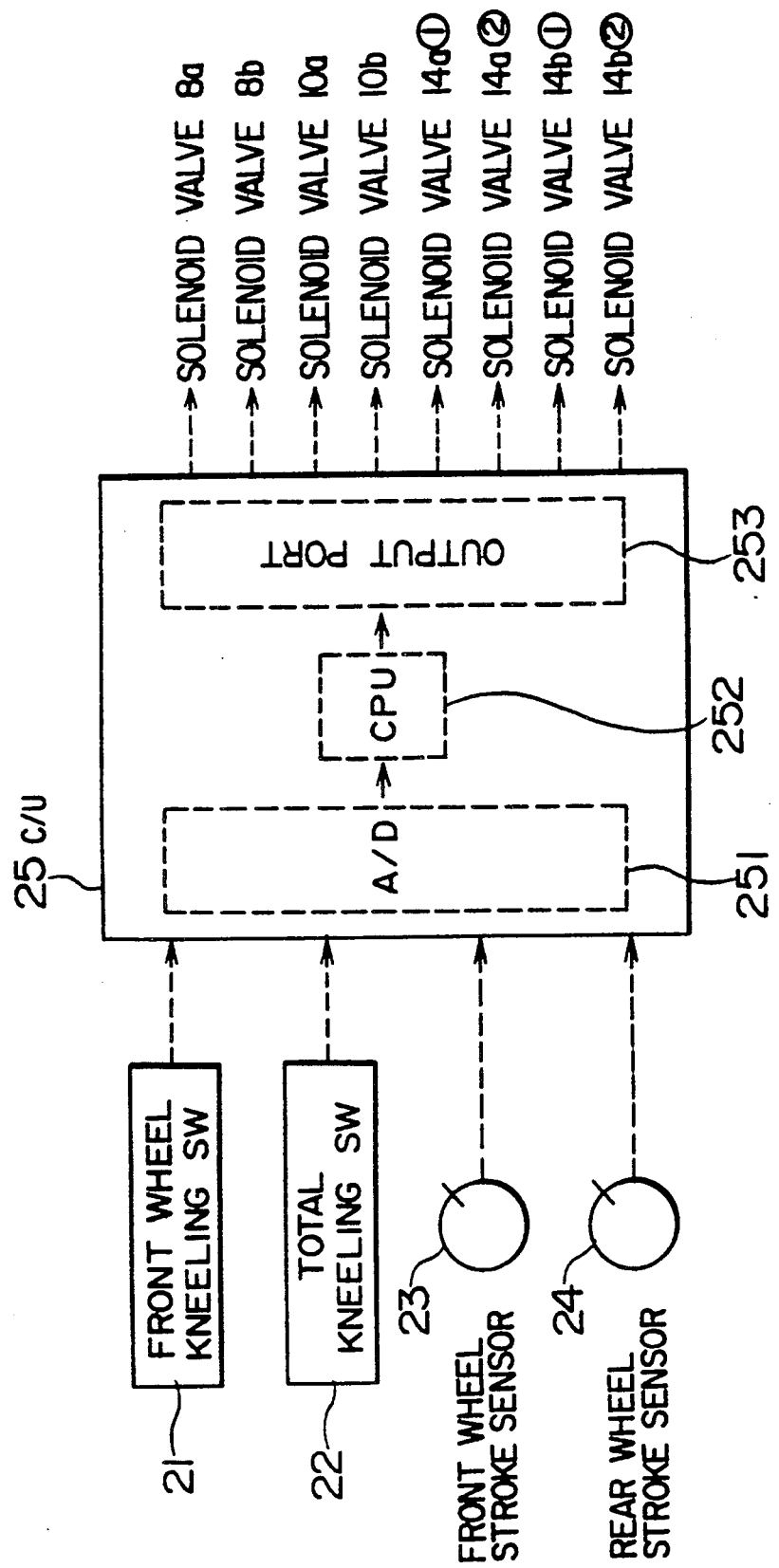
FIG. 2 is a block diagram illustrating the control unit (C/U) of the vehicle height adjusting device according to the present invention.
Figure 16:
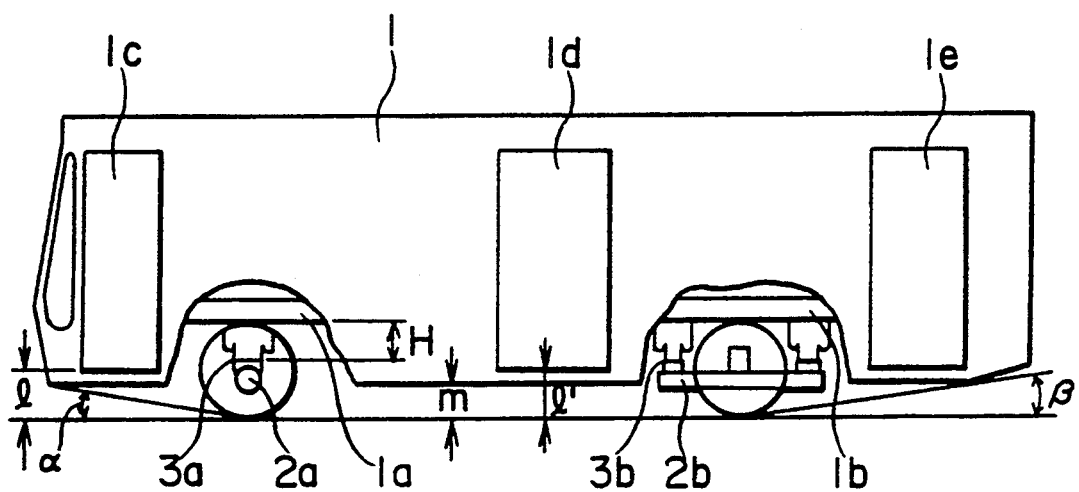
FIG. 16 is a schematic diagram illustrating a conventional, general air suspension-equipped vehicle.

FIG. 2 is a block diagram showing a control system for the above arrangement. In this diagram, reference numerals 21 and 22 denote a front wheel kneeling switch and a total kneeling switch respectively, which are operated by a driver when he desires to make kneeling for a front door 1c or total kneeling for front door 1c, middle door 1d and rear door 1e shown in FIG. 16. Reference numerals 23 and 24 denote stroke sensors which detect a relative distance between the vehicle body and front and rear axles. Reference numeral 25 denotes a C/U (Control Unit) as control means that includes an A/D converter 251, a CPU 252 and an output port 253, and that generates output signals for the control of the solenoid valves 8a, 8b, 10a, 10b, 14a①, 14a②, 14b① and 14b②, shown in FIG. 1.

It is to be noted that the stroke sensors 23 and 24 shown in FIG. 2 may be attached to a piston rod 11ab (see FIG. 15) of the air cylinder 11a, or may be attached to a piston rod 12ab of the oil cylinder 12a. Further, an air cylinder or an oil cylinder that incorporates such a stoke sensor may be employed.

Outline of Operation

Next, the outline of the operation in this arrangement will be explained. It is to be noted that since the Ft and Rr kneeling circuits are identical units as illustrated in FIG. 1, only the operation of the Ft kneeling circuit will be described.

Figure 17:
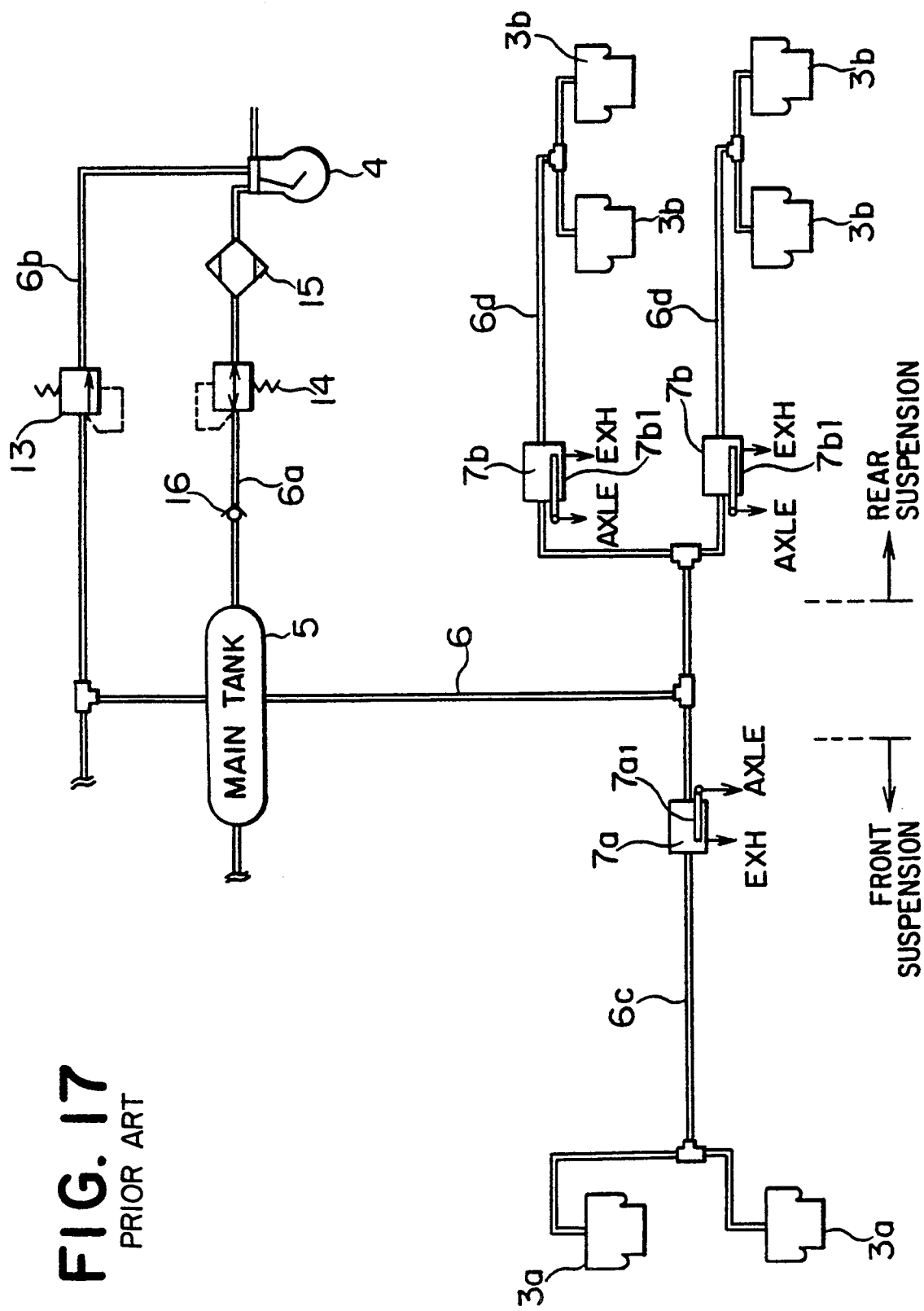
FIG. 17 is a piping diagram showing an air control circuit in the conventional, general air suspension-equipped vehicle.

In a normal running mode, the air switch-over valve 8a is made inactive so that the air spring 3a communicates with the leveling valve 7a to form a general automatic vehicle height adjusting circuit (air suspension circuit) for a bus, as illustrated in FIG. 17.

Figure 15:
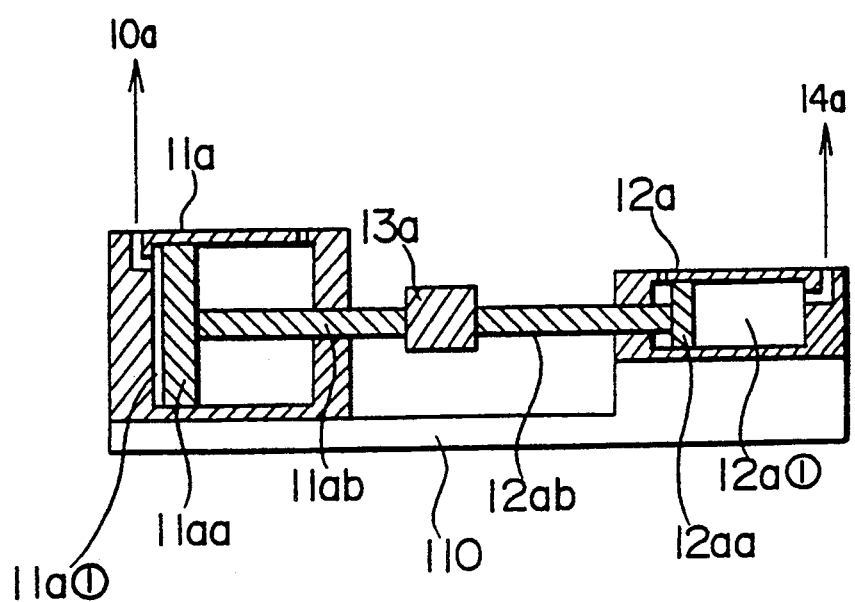
FIG. 15 is a cross sectional view of the arrangement of another embodiment of the air reservoir device used in the vehicle height adjusting device according to the present invention.

At this time, a piston 11aa in the air cylinder 11a is fully forced to the left in FIG. 15 as illustrated, and no air is retained in the air chamber 11a①. The coupling 13a couples the piston 11aa to the piston 12aa in the oil cylinder 12a, both of which face along the same axis. Hydraulic fluid is retained in a hydraulic chamber 12a① of the oil cylinder 12a and the double-action solenoid valve 14a is closed (at its middle position) so that the movement of the pistons 11aa and 12aa in the cylinders 11a and 12a is halted.

In order to perform kneeling, when the C/U 25 detects that the front wheel kneeling switch 21 has been made ON by a driver, it makes the air switch-over valve (solenoid valve) 8a and the two-way solenoid valve 10a ON (their excited states). Accordingly, the air spring 3a is to communicate with the air chamber 11a① of the air cylinder 11a through the air pipe 17a. At this time, the suspended weight of the bus is applied as the internal air pressure of the air spring 3a to the piston 11aa. This internal pressure drives the piston 11aa to push the piston 12aa of the oil cylinder 12a, however, as the double-action three-way solenoid valve 14a is still closed, neither of the pistons moves.

Thereafter, when the kneeling side solenoid ① of the double-action three-way solenoid valve 14a is made ON, the pistons 11aa and 12aa are driven by air pressure, and the hydraulic fluid in the hydraulic chamber 12a① of the oil cylinder 12a is returned through the double-action three-way solenoid valve 14a to a drain tank (not shown). To control the speed of both pistons, the speed controller 15a is provided.

Since the piston 11aa continues to push the piston 12aa as long as the suspended weight of the bus is applied as air pressure to the piston 11aa, the bus body accordingly continues to descend (kneeling).

The descent is stopped: ① when the kneeling side solenoid ① of the double-action three-way solenoid valve 14a is made OFF; ② when the stroke of the air cylinder 11a or the oil cylinder 12a reaches its limit; or ③ when the air spring 3a reaches its stroke limit and contacts a buffer rubber (not shown). It is to be noted that in case ①, presuming that, for example, the pressure received area of the air spring 3a be constant regardless of the height of the air spring 3a, and neglecting the resistance of the pipes, the air pressures in the air spring 3a, the pipe 17a and the air chamber 11a① will be the same when the air cylinder 11a is stopped, and the altitude of the bus body 1 will therefore be the one assumed at the point the air cylinder 11a is stopped.

Under these circumstances, detecting that the front wheel kneeling switch 21 has been made OFF (returning operation has been selected), the C/U 25 makes the return side solenoid ② of the double-action three-way solenoid valve 14a ON. Thus, the hydraulic fluid from the hydraulic source 20 is supplied to the oil cylinder 12a, and the pressure of the hydraulic fluid renders the piston 12aa in the oil cylinder 12a to force the piston 11aa in the air cylinder 11a. The air retained in the air chamber 11a① is therefore returned to the air spring 3a.

Since the internal pressure in the air spring 3a is a degree of several kg/cm², and the discharge pressure of a power steering pump, for example, is over 100 kg/cm², the vehicle body 1 can be elevated even if the oil cylinder 12a has a small diameter. In addition, other advantages of a hydraulic system, such as speed control and operation start/stop controls, are also effectively available.

On the other hand, when a driver makes the total kneeling switch 22 ON, the C/U 24 lowers the front part of the vehicle body according to the above-mentioned control operations together with the rear part thereof in the same control manner.

When the driver then makes the total kneeling switch 22 OFF, the C/U 25 returns both of the Rr air springs 3b and the Ft air springs 3a to their original states. The return operation of the rear part of the vehicle body is the same as was described for the front part thereof.

Detailed Description of Operation

The above described outline of operation will now be explained in detail while referring to the flowcharts in FIGS. 3 to 12 presenting programs which are stored in and executed by the CPU 252 of the C/U 25 in FIG. 2.

Figure 3:
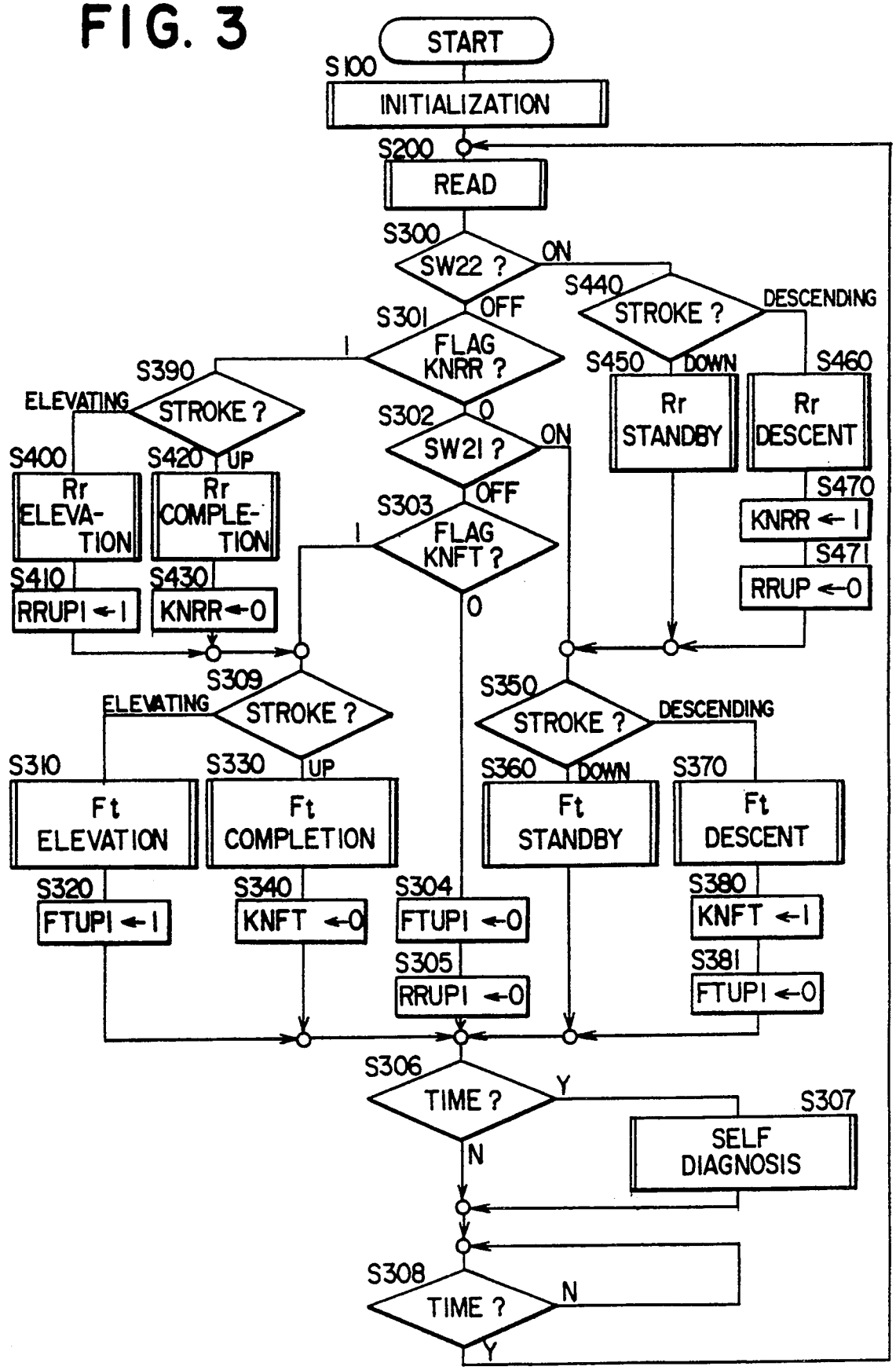
FIG. 3 is a flowchart of a general program to be executed by the control unit of the vehicle height adjusting device according to the present invention.

In FIG. 3, first, initialization is performed in subroutine S100 after power is switched on. Then, the output values of the front wheel kneeling switch 21, the total kneeling switch 22, and the stroke sensors 23 and 24 are read in subroutine S200. The details of subroutine S200 are shown in FIG. 4.

Figure 4:
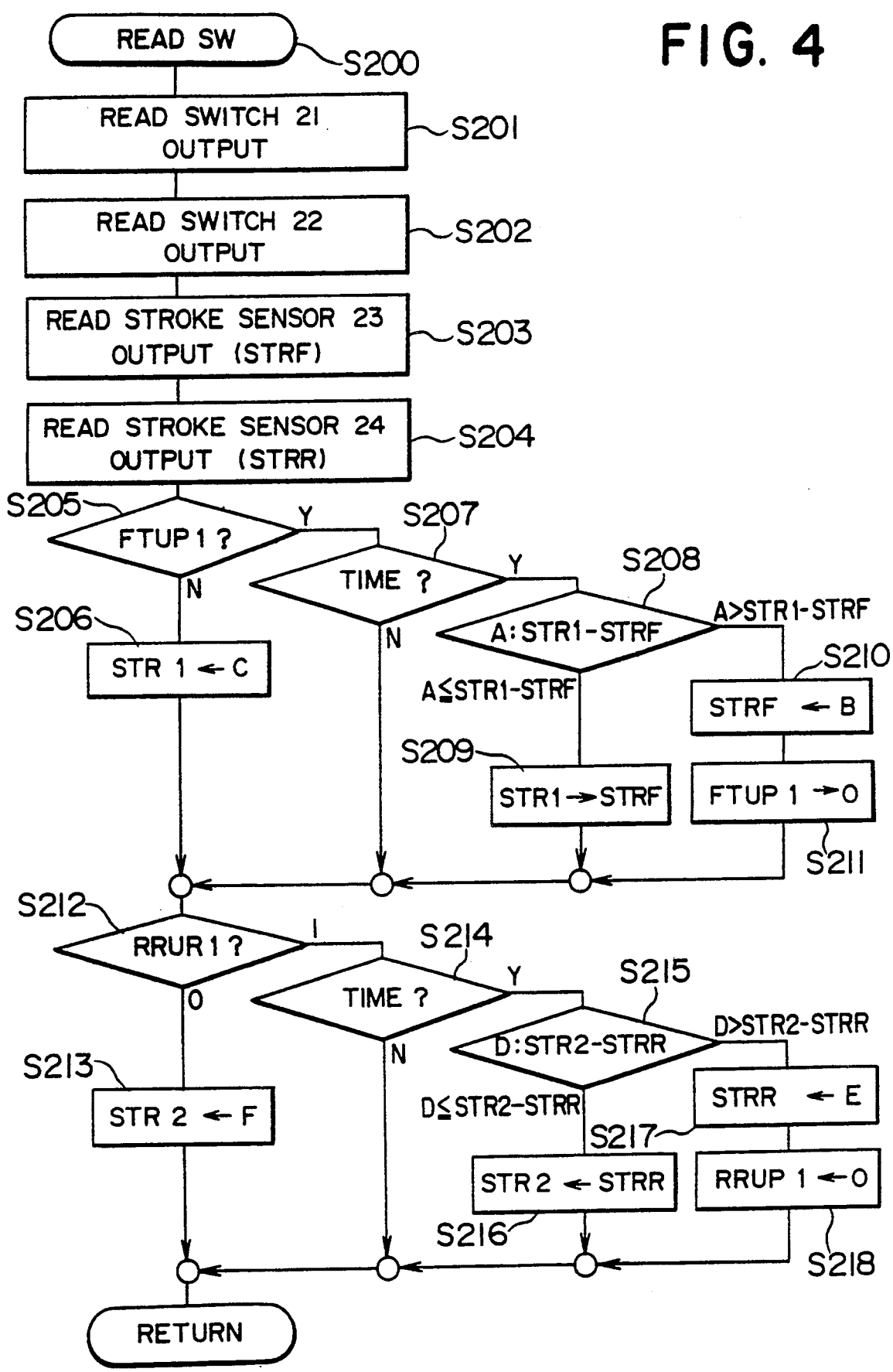
FIG. 4 is a specific flowchart of a read subroutine in the flowchart in FIG. 3.

In FIG. 4, the above described output values are read at steps S201 to S204, and a flag that indicates whether the front (Ft) of the vehicle is ascending is checked at step S205.

If a flag FTUP1 is consequently found to be set, the front of the vehicle is ascending and the program goes to step S207. If the flag FTUP1 is found to be reset, the front of the vehicle is not ascending and a lowest limit value C of the front part of the body is substituted into a stroke history value STR1 of the body.

At step S207, the program proceeds to step S208 to detect a degree of elevation. In this case, A denotes a reference value for a change in the stroke within a given period. This reference value A is compared with STR1−STRF, the difference between the stroke value STRF read at step S203 and the stroke value STR1 before a given period. If the difference STR1−STRF indicates a change equal to or greater than the reference value A, the stroke history value STR1 is updated at step S209.

If the value of STR1−STRF is equal to or smaller than the reference value A, the program proceeds to step S210 where a stroke reference value B indicating that the vehicle has almost returned to its original height is substituted as a pseudo value into STRF, and the flag FTUP1 is reset at step S211.

A stroke for the rear part of the vehicle is checked at steps S212 to S218 in the same manner as at steps S205 to S211.

Now back to FIG. 3, a check is performed at step S300 to determine whether or not the total kneeling switch 22 for lowering the vehicle body in its entirety is made ON. If the total kneeling switch 22 is found to be ON, it is assumed that the vehicle is descending and the program proceeds to step S440. If not ON, a flag KNRR that indicates whether the total kneeling is being performed is checked at S301.

If the total kneeling switch 22 is OFF and the kneeling is being performed (flag KNRR=1), the program proceeds to step S390; however, if that kneeling is not the total kneeling, the program proceeds to step S302.

Determination is performed at step S302 as to whether or not the front wheel kneeling switch 21 for lowering only the front part of the vehicle is set ON. If it is found to be ON, it is assumed that the vehicle is descending, and the program proceeds to step S350. On the contrary, if it is found to be OFF, a flag KNFT indicating that only the front kneeling is being performed is checked at step S303.

Consequently, if the front kneeling switch 21 is in the OFF state and the kneeling is being performed (flag KNFT=1), the program proceeds to step S309. If the flag KNFT is reset to "0", indicating that the kneeling is not being performed, the flags are reset to "0" at steps S304 and S305.

Then at step S306, a self diagnosis for a control system is performed in subroutine S307 (not illustrated) per a fixed time, and after a fixed time has lapsed at step S308, the program returns to step S200.

Next, descent→stop→elevation operations for only the front part of the vehicle body will be explained.

If it is determined at step S302 that the descent operation is selected, the current stroke value STRF is compared with a lowest kneeling limit value F at step S350. If the vehicle body is found to be descending, the program proceeds to subroutine S370. If the vehicle height has reached the lowest (DOWN) position, the program goes to subroutine S360.

Figure 5:
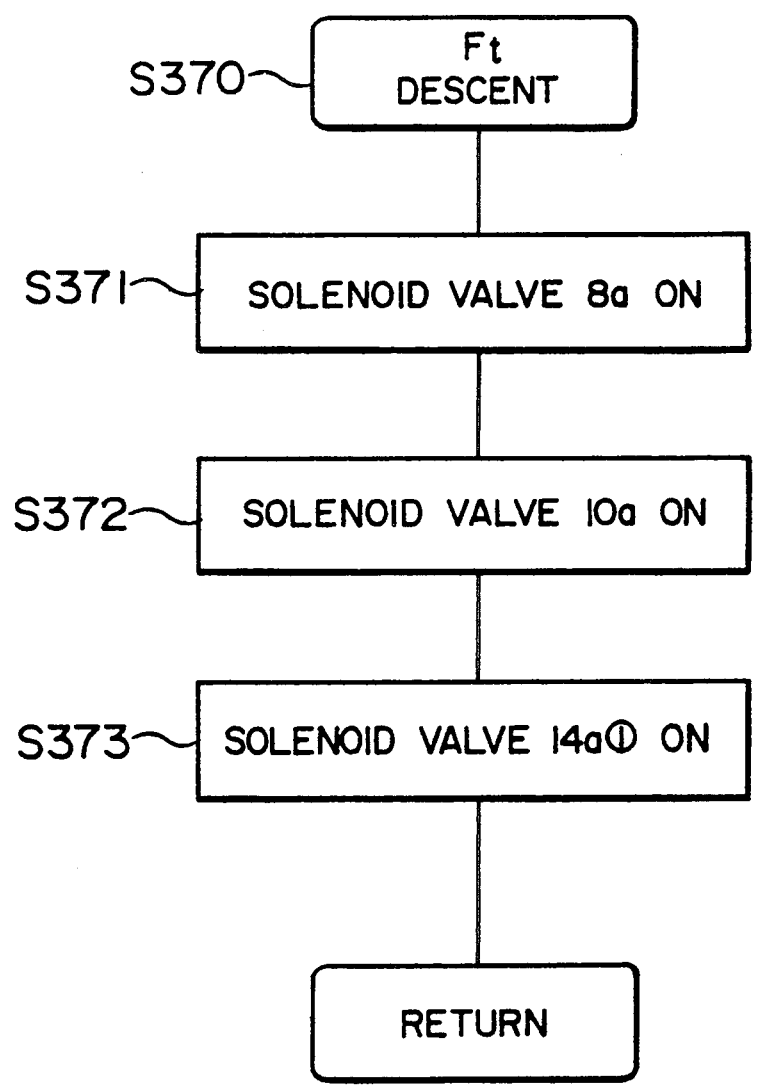
FIG. 5 is a flowchart of a front descent subroutine in the flowchart in FIG. 3.

Subroutine S370 (Ft descent) is concretely shown in FIG. 5, in which the individual solenoid valves are made ON at steps S371 to S373. At steps S371 to S373, the activation of the solenoid valves is instructed, but a different program, not explained here, actually activates the solenoid valves.

After subroutine S370, the flag KNFT, indicating that the front kneeling of the body is being performed is set at step S380, and the flag FTUP1 indicating the elevation of the vehicle is reset at step S381.

Figure 6:
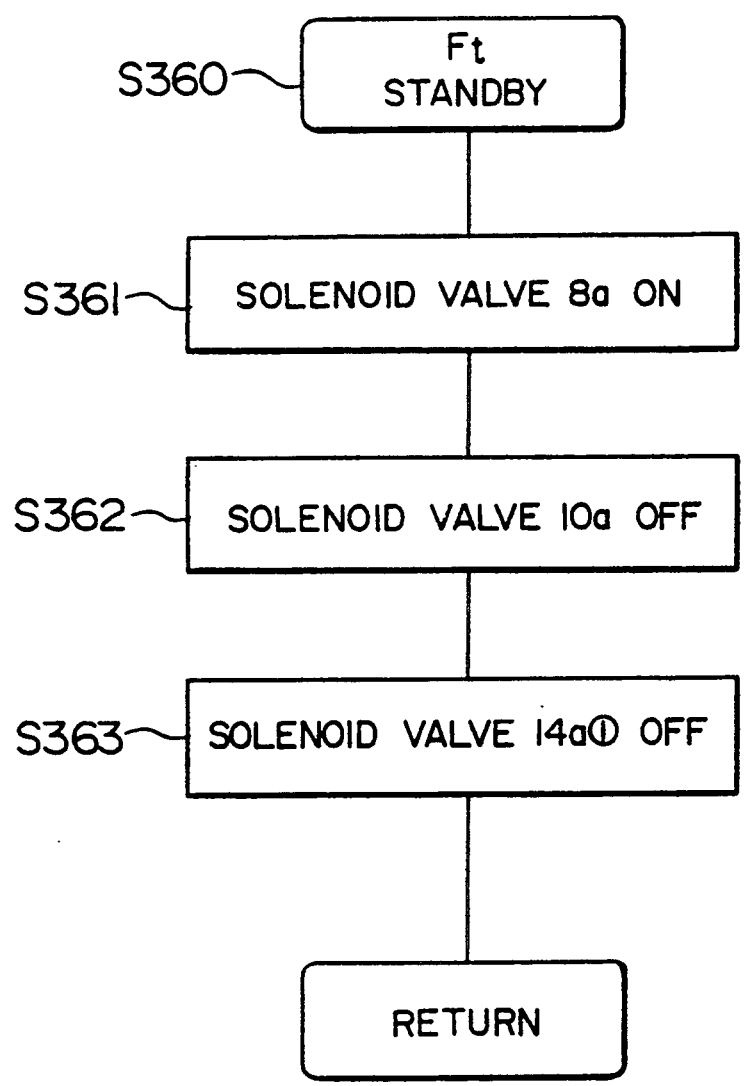
FIG. 6 is a flowchart of a standby subroutine after front descent in the flowchart in FIG. 3.

Subroutine S360 (Ft standby) is concretely illustrated in FIG. 6, in which only the three-way solenoid valve 8a is set ON at step S361 to stop the function of the leveling valve 7a, while the other solenoid valves are all made OFF and the vehicle body is returned to its normal state.

The two-way solenoid valve 10a is made OFF at step S362 to break the air circuit between the air spring 3a and the air cylinder 11a. This is done to minimize the elevation of the vehicle body since the air spring 3a extends and increases the vehicle height if the air spring 3a communicates with the air cylinder 11a when the suspended weight varies, i.e., when the number of passengers decreases, between the positions before kneeling and at the descent stop.

Next, upon the elevation of the front part of the vehicle body and the return to its original height, the kneeling switch 21 is made OFF, and as the flag KNFT is still set to "1", the program proceeds to step S309 where the stroke STRF is checked.

If the stroke STRF has not reached the reference value B which regards that the vehicle body has returned to its original height but is still increasing, the program proceeds to subroutine S310. If the stroke STRF has reached the reference value B, the program proceeds to subroutine S330. Even when the vehicle body has not completely returned to its original height due to a load change, as step STRF has been found at step S200 to equal the reference value B, the program can proceed to subroutine S330.

Figure 7:
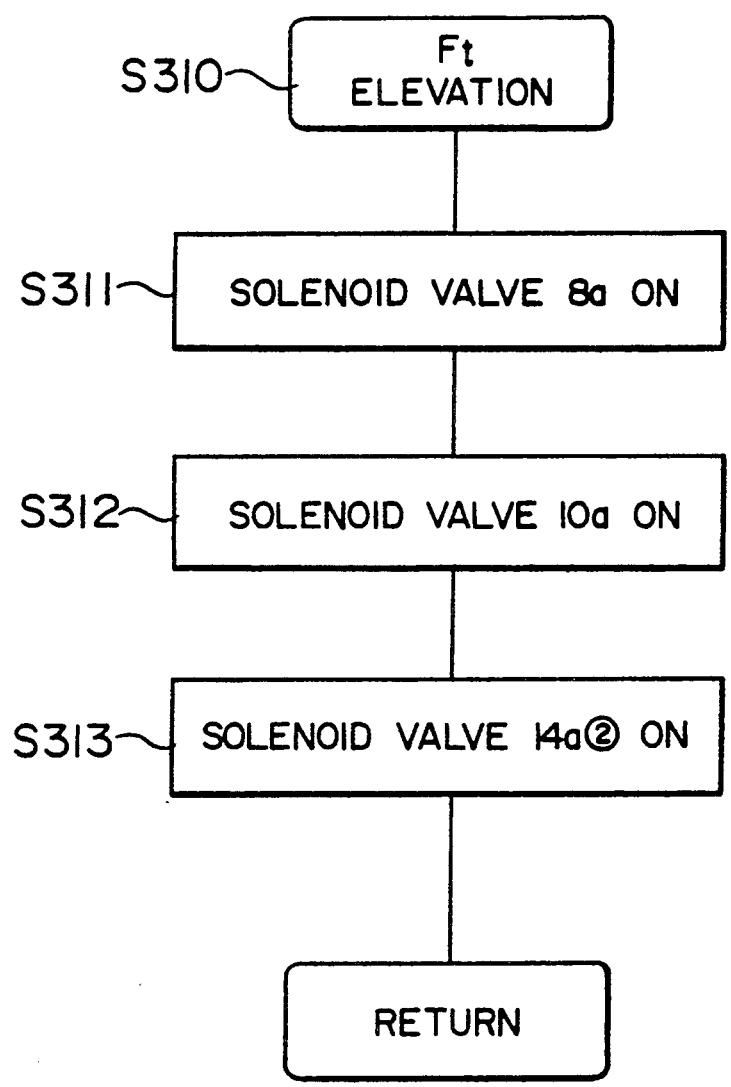
FIG. 7 is a flowchart of a front elevation subroutine in the flowchart in FIG. 3.

An embodiment of subroutine S310 (Ft elevation) is illustrated in FIG. 7, in which by activating the solenoid valves 8a, 10a and 14a② at steps S311 to S313 a circuit is formed to return the air that has been retained in the air chamber 11a① of the air cylinder 11a to the air spring 3a by the hydraulic pressure from the hydraulic source 20.

Since the flag FTUP1 indicating the elevation is set to "1" at step S320, once step S320 is carried out (the elevation operation is entered), a pseudo signal process in subroutine S200 can be performed.

Figure 8:
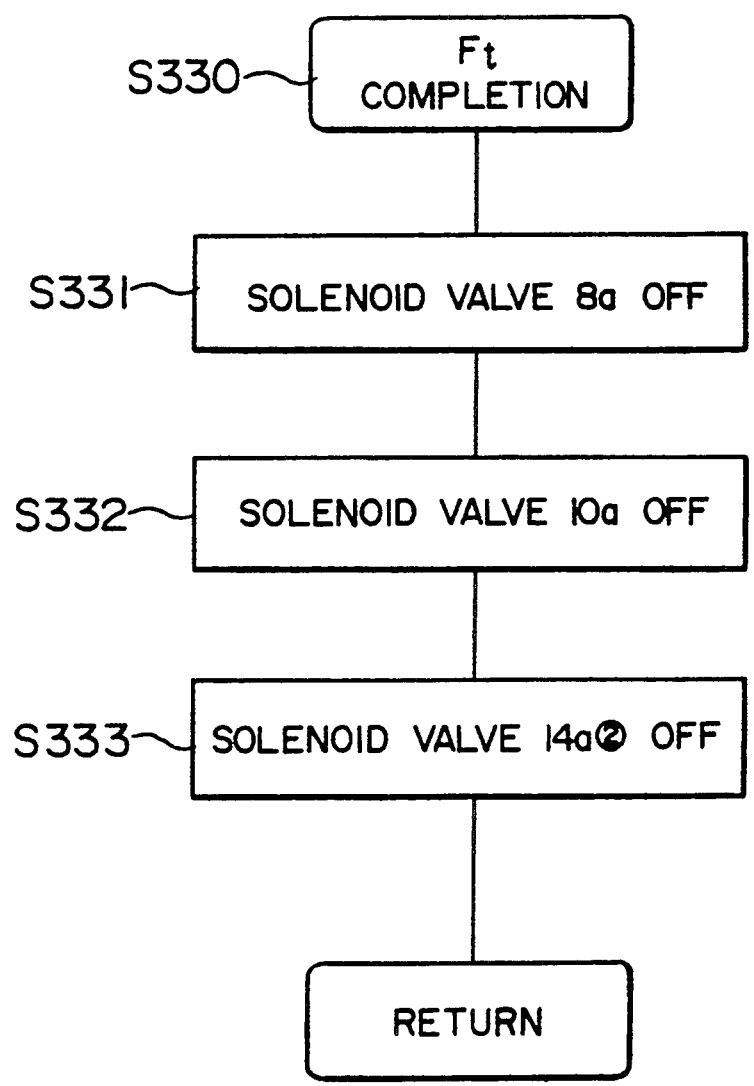
FIG. 8 is a flowchart of a front elevation completion subroutine in the flowchart in FIG. 3.

If, at step S309, the vehicle body is found to have returned to its original height, as illustrated by subroutine S330 in FIG. 8, the solenoid valves 8a, 10a, and 14a② are made OFF at steps S331 to S333 to return the air suspension circuit to its normal condition, and the flag KNFT indicating the kneeling being performed is reset to "0" at step S340.

When the driver switches the total kneeling switch 22 for the total kneeling to the ON state, a determination is performed at step S300 as to whether or not the total kneeling switch 22 is set ON. If it is found to be ON, a stroke is checked at step S440.

Figure 9:
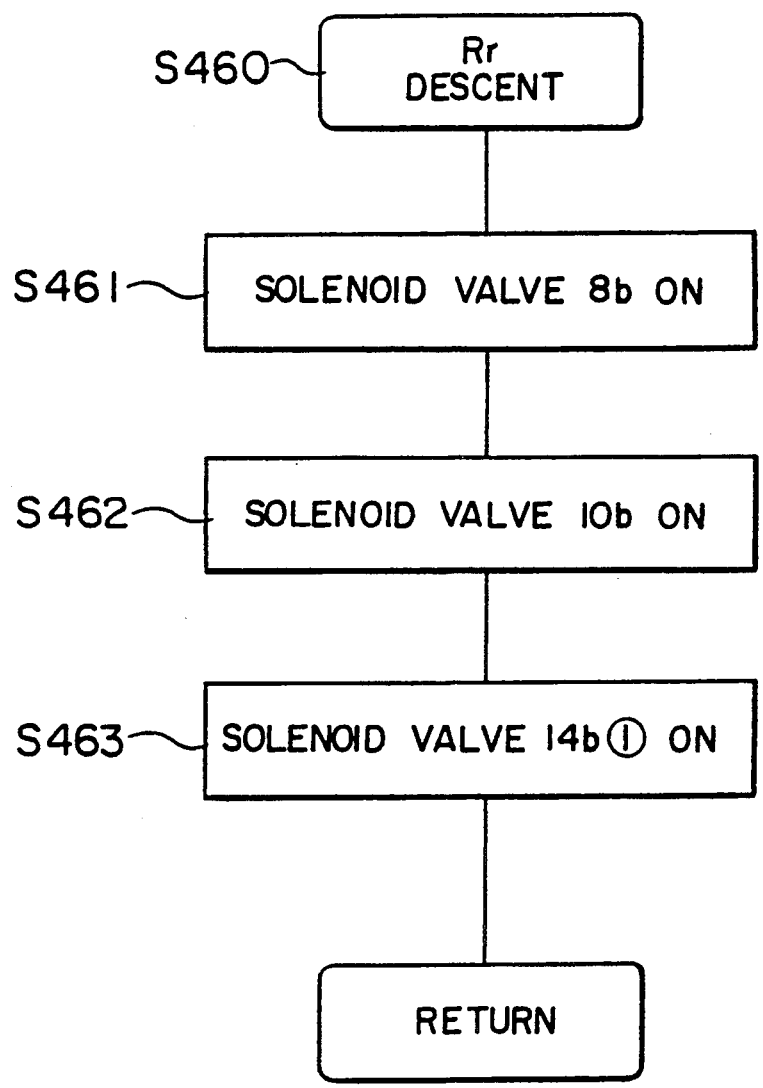
FIG. 9 is a flowchart of a rear descent subroutine in the flowchart in FIG. 3.

If the stroke is decreasing, subroutine S460 (Rr descent) shown in FIG. 9 is performed. Since this subroutine S460 is the same as subroutine S370, the explanation is omitted.

Then, the flag KNFT that indicates a series of kneeling operations is set to "1" at step S380. This is because the processes at step S309→subroutine S310/S330 are carried out when the total kneeling switch 22 is set OFF during the descending for the purpose of returning the vehicle body to its original height and the air suspension circuit to the normal condition. Then, the elevation flag FTUP1 is reset at step S381.

Figure 10:
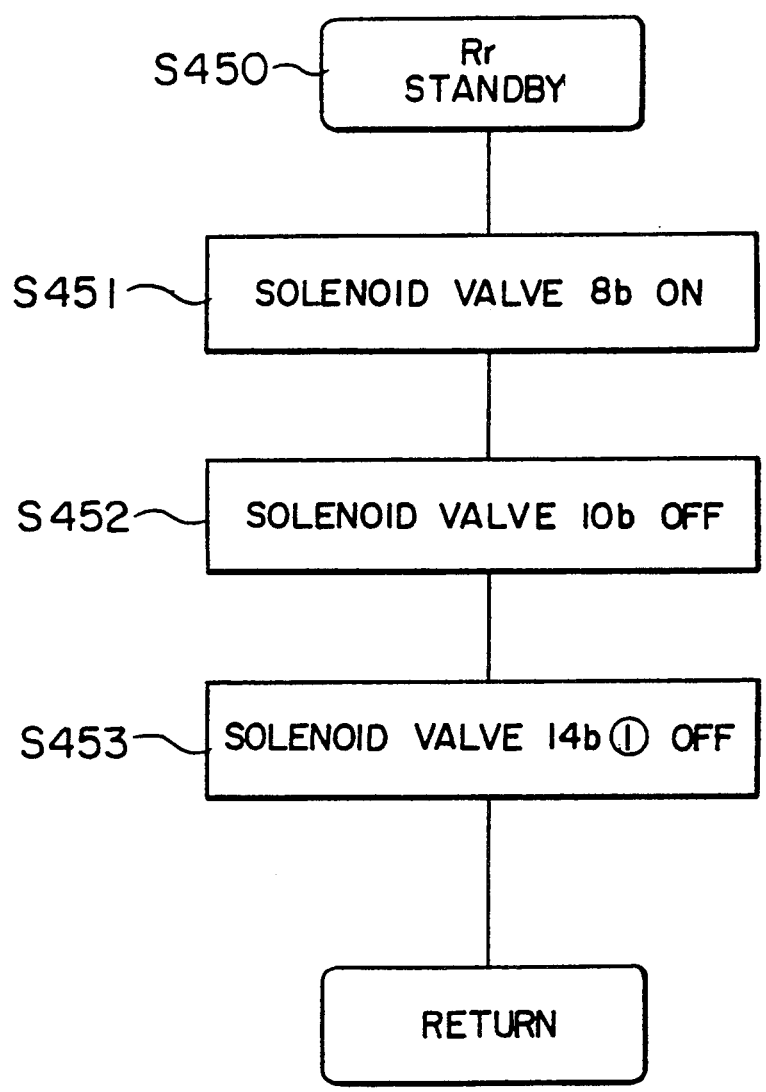
FIG. 10 is a flowchart of a standby subroutine after rear descent in the flowchart in FIG. 3.

When, at step S440, the descent of the rear part of the body is found to have been completed, an instruction for forming a stop/standby circuit is provided as an output in subroutine S450, shown in FIG. 10.

Following this Rr process, the program proceeds to step S350 to perform a Ft process. Both the Ft and Rr begin to descend at the same time, and even if either Ft or Rr has completely descended beforehand and is at a standby condition, the other descending process is continued.

The return operation of the vehicle height is started when the total kneeling switch 22 is set to OFF. Since the flag KNRR is set at step S470, the program proceeds from step S301 to step S390.

Figure 11:
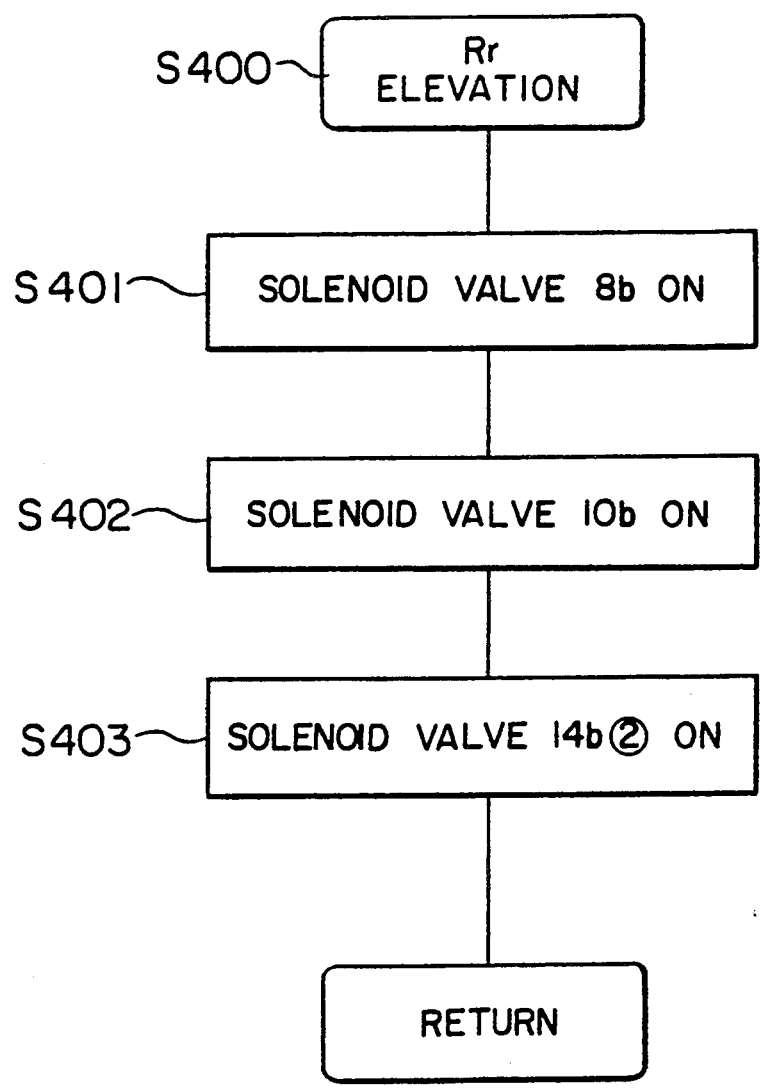
FIG. 11 is a flowchart of a rear elevation subroutine in the flowchart in FIG. 3.

If the elevation is found to be in progress (including before start) at step S390, the program proceeds to step S400 in FIG. 11. If the elevation has been regarded as completed, the program proceeds to step S420. As step S400 is the same as step S310, the explanation is omitted.

Then, since the flag RRUP is set at step S410, the pseudo stroke in subroutine S200 can be provided.

Figure 12:
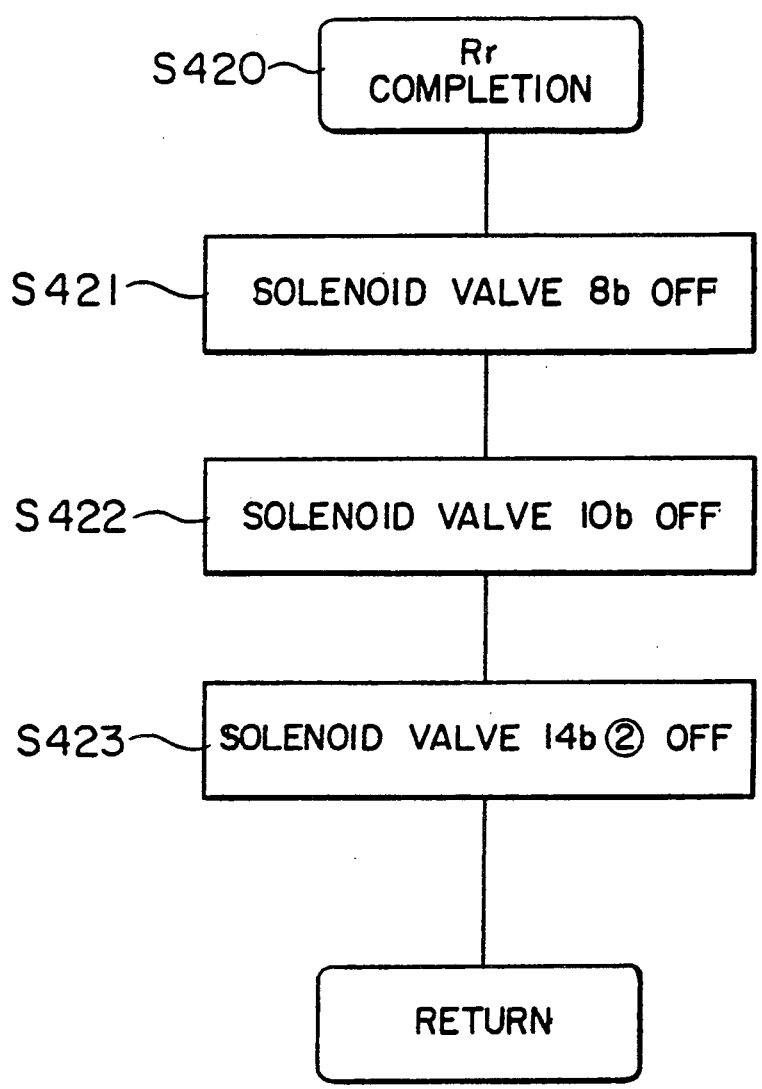
FIG. 12 is a flowchart of a rear elevation completion subroutine in the flowchart in FIG. 3.

Subroutine S420, shown in FIG. 12, represents completion of the Rr elevation and is the same as step S330 as to the operation.

As the processes at step S309→step S310/S330 are carried out following steps S400 and S420, the Ft and Rr elevations begin at the same time. Even if either the Ft or Rr elevation is completed beforehand, the instructions for the other elevation are continued as the flags KNFT and KNRR are independently set.

When the flags KNFT and KNRR which indicate kneeling operation being performed are reset to "0" at steps S430 and S340, it means that all kneeling controls have been completed. The program loop proceeds from step S303 to steps S304 and S305, where the individual flags indicating that the height adjusting operation are reset, and this loop is repeated up to the start of the next vehicle height adjustment.

Figure 13:
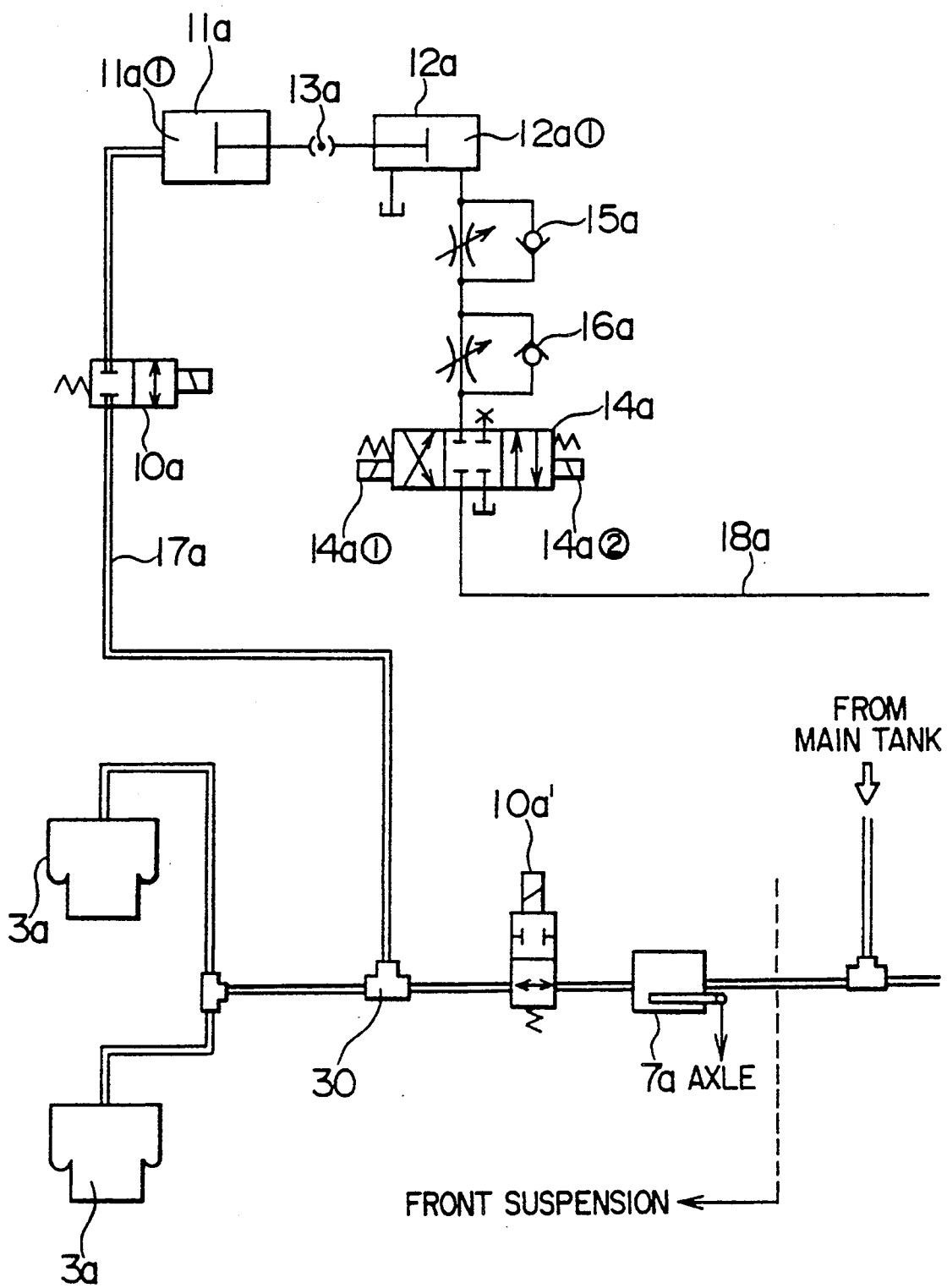
FIG. 13 is a piping diagram partially illustrating the arrangement of a modification of the vehicle height adjusting device according to the present invention.

FIG. 13 illustrates modifications of air switch-over valve means and a kneeling circuit that are used in a vehicle height adjusting device according to the present invention. The three-way solenoid valve 8a in the embodiment shown in FIG. 1 is replaced with a two-way solenoid valve 10a' that serves as a shut-off valve. This two-way solenoid valve 10a' and a T-junction pipe 30 constitute air switch-over valve means. The kneeling circuit comprises an air reservoir device (including the air cylinder 11a, the coupling 13a, and the oil cylinder 12a), the two-way solenoid valve 10a, the speed controllers 15a and 16a, the double-action three-way solenoid valve 14a, the air pipe 17a, and the hydraulic pipe 18a, and is connected to the air spring 3a and the two-way solenoid valve 10a via the T-junction pipe 30. It should be noted that though this illustration shows only the Ft circuit, the Rr circuit has the same units as the Ft circuit, also in this embodiment, similar to the embodiment in FIG. 1.

In FIG. 13, under normal running conditions, the two-way solenoid valve 10a' is made OFF, and the air spring 3a are made to communicate with the leveling valve 7a and the kneeling circuit. In the kneeling operation, the two-way solenoid valve 10a' is made ON to break the route between the kneeling circuit and the leveling valve 7a. Other controls are performed in the same manner as in the embodiment shown in FIG. 1.

Figure 14:
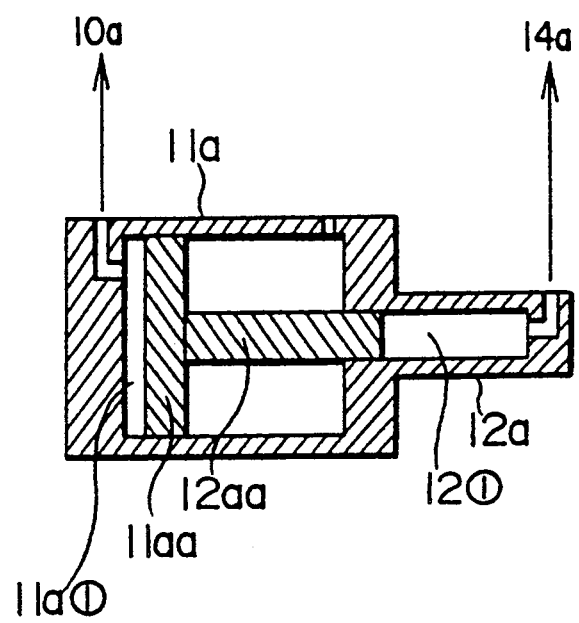
FIG. 14 is a cross sectional view of the arrangement of one embodiment of an air reservoir device used in the vehicle height adjusting device according to the present invention.

FIG. 14 illustrates the structure of one embodiment of a hydraulic/pneumatic converter which serves as an air reservoir device used in a vehicle height adjusting device according to the present invention. In this illustration, the air cylinder 11a and the oil cylinder 12a are formed as a single unit. The piston rod of the piston 11aa which feeds the air from the air chamber 11a① of the air cylinder 11a to the solenoid valve 10a, and the piston 12aa of the hydraulic chamber 12a① of the oil cylinder 12a are also formed as a single unit, which responds to the hydraulic fluid flow from the solenoid valve 14a.

FIG. 15 shows the structure of another embodiment of a hydraulic/pneumatic converter as an air reservoir device. This converter is designed so that, as employed and explained referring to FIG. 1, the air cylinder 11a and the oil cylinder 12a are disposed on the frame 110, opposite to each other along the same axis, and the pistons 11aa and 12aa are formed as a single unit by coupling their rods 11ab and 12ab with the coupling 13a.

As described above, a vehicle height adjusting device according to the present invention is arranged such that: it has kneeling circuits which include an air reservoir device: When kneeling, air in air springs is moved to and stored in an air reservoir device thereby to perform front kneeling or total kneeling of the vehicle body: When returning from the kneeling, in response to hydraulic pressure from a hydraulic source, the air stored in the air reservoir device is returned to the air springs via the respective kneeling circuits, thereby returning the vehicle to its original height and to a normal air suspension condition by leveling valves. Accordingly, the following Special effects can be obtained.

① Not only forward kneeling of a vehicle but also total kneeling can be performed.

② No exhausted air into the atmosphere prevents the durability of an air compressor due to a long, continuous operation from being deteriorated.

③ Elevation speed while a vehicle is being returned to its original height can be made faster than conventional speed.

Further, as either a commercially available hydraulic/pneumatic converter or a combined air cylinder and oil cylinder can be used as an air reservoir device, a vehicle height adjusting device according to the present invention can be produced at a lower cost.

We claim:
1. A vehicle height adjusting device, comprising:
an automatic vehicle height adjusting circuit connecting a pneumatic source to air springs through a leveling valve;
an air switch-over valve unit provided between said leveling valve and said air springs;
a kneeling circuit connected to said air springs through said air switch-over valve unit;
a hydraulic source coupled to said air springs; and
control means for storing the air from said air springs in said kneeling circuit by switching over said air switch-over valve unit when kneeling, and for returning said air to said air springs under hydraulic pressure from said hydraulic source in the return of the vehicle height, said kneeling circuit including an air reservoir device which has a volume variable air chamber and a hydraulic mechanism that varies the volume of said air chamber based on the hydraulic pressure, a first shut-off valve, an air pipe which connects said air chamber to said air switch-over valve unit via said first shut-off valve, a hydraulic switch-over valve, and a hydraulic pipe that connects said hydraulic mechanism to said hydraulic switch-over valve and said hydraulic source.

2. A vehicle height adjusting device according to claim 1, wherein said air switch-over valve unit includes a T-junction pipe for said air springs and said kneeling circuit and a second shut-off valve provided between said T-junction pipe and said leveling valve, and wherein said control means opens said second shut-off valve only during kneeling.

3. A vehicle height adjusting device according to claim 1, wherein said air reservoir device is a hydraulic/pneumatic converter with a container and one piston in the container, where one space defined by said piston forms an air chamber and the other defined space forms a hydraulic chamber.

4. A vehicle height adjusting device according to claim 1, wherein said air reservoir device is a hydraulic/pneumatic converter where an air cylinder and an oil cylinder are provided as a pair along a single axis and a piston rod of said air cylinder forms a piston of said oil cylinder.

5. A vehicle height adjusting device according to claim 1, wherein said air reservoir device is a hydraulic/pneumatic converter where an air cylinder and an oil cylinder are provided as a pair along a single axis and piston rods of said air and oil cylinders are interconnected.

6. A vehicle height adjusting device according to claim 1, wherein said control means, when kneeling, switches over said air switch-over valve unit to allow said air springs to communicate with said air chamber, and concurrently switches over said hydraulic switch-over valve to return hydraulic fluid from said hydraulic mechanism to a hydraulic tank, thereby introducing and storing the air of said air springs into said air chamber due to the free dropping operation of the suspended weight of said vehicle; and, in the return of the vehicle height, said control means switches over said hydraulic switch-over valve to permit said hydraulic mechanism to communicate with said hydraulic source so that pressure exerted by the hydraulic fluid from said hydraulic source expands the volume of said hydraulic mechanism thereby decreasing the volume of said air chamber to return the air stored in said chamber.

7. A vehicle height adjusting device according to claim 1, wherein said hydraulic source is common with other vehicle mounted hydraulic sources.

8. A vehicle height adjusting device according to claim 2, wherein said air reservoir device is a hydraulic/pneumatic converter with a container and one piston in the container, where one space defined by said piston forms an air chamber and the other defined space forms a hydraulic chamber.

9. A vehicle height adjusting device according to claim 2, wherein said air reservoir device is a hydraulic/pneumatic converter where an air cylinder and an oil cylinder are provided as a pair along a single axis and a piston rod of said air cylinder forms a piston of said oil cylinder.

10. A vehicle height adjusting device according to claim 2, wherein said air reservoir device is a hydraulic/pneumatic converter where an air cylinder and an oil cylinder are provided as a pair along a single axis and piston rods of said air and oil cylinders are interconnected.

11. A vehicle height adjusting device according to claim 2, wherein said control means, when kneeling, switches over said air switch-over valve unit to allow said air springs to communicate with said air chamber, and concurrently switches over said hydraulic switch-over valve to return hydraulic fluid from said hydraulic mechanism to a hydraulic tank, thereby introducing and storing the air of said air springs into said air chamber due to the free dropping operation of the suspended weight of said vehicle; and, in the return of the vehicle height, said control means switches over said hydraulic switch-over valve to permit said hydraulic mechanism to communicate with said hydraulic source so that pressure exerted by the hydraulic fluid from said hydraulic source expands the volume of said hydraulic mechanism, thereby decreasing the volume of said air chamber to return the air stored in said air chamber.

12. A vehicle height adjusting device according to claim 2, wherein said hydraulic source is common with other vehicle mounted hydraulic sources.

* * * * *